UNITED STATES PATENT OFFICE.

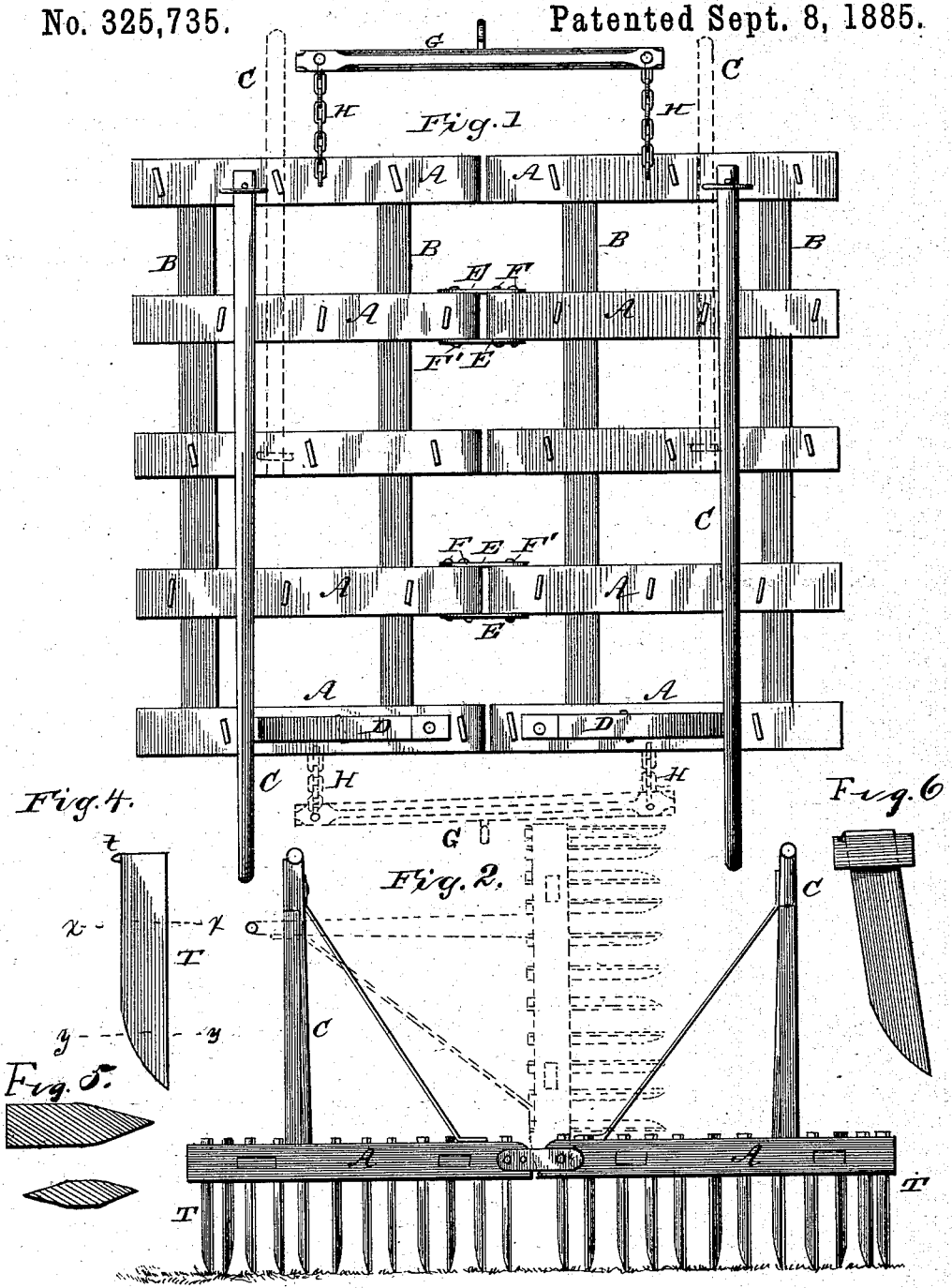

JOSEPH DARBY, OF WASHINGTON, DISTRICT OF COLUMBIA.

HARROW.

SPECIFICATION forming part of Letters Patent No. 325,735, dated September 8, 1885.

Application filed June 10, 1885. (No model.)

*To all whom it may concern:*

Be it known that I, JOSEPH DARBY, a citizen of the United States, residing at Washington, in the District of Columbia, have invented certain new and useful Improvements in Harrows; and I do hereby declare the following to be a full, clear, and exact description of the invention, such as will enable others skilled in the art to which it appertains to make and use the same.

My invention consists of certain new devices and combinations, which will be fully understood by the following description and claims.

In the accompanying drawings, Figure 1 is a top view of my improved harrow. Fig. 2 is a rear view of the same. Figs. 3 and 4 are detail views detached. Fig. 5 shows sections of the harrow-tooth on lines $x\,x$ and $y\,y$, Fig. 4. Fig. 6 is a side view of the harrow-tooth slightly inclined downward and forward.

The chief object of my invention is to make a pulverizing and leveling harrow that will cut the entire surface of its track into narrow furrows of about one inch and a half wide and of the desired depth, thus completely pulverizing, loosening, and leveling the same.

The teeth of my harrow are to be made of spring-steel, properly hardened and tempered, and arranged in the frame as will be hereinafter described.

The frame is represented in Fig. 1. I prefer to employ a series of five transverse bars, A, in order to set the teeth three inches apart, so as not to clog, while they travel in paths which when extended are only one and a half inch apart. These bars A are connected by bars B—say one inch thick by three in width—passing through mortises in bars A, which may be three or four inches square, and if found too light more weight may be added as desired, or the bars A and cross-bars B may be bolted together, if desired.

My harrow-frame is made in two parts hinged together, in order to tilt, as indicated in dotted lines in Fig. 2, for the purpose of passing stumps and stones, and also to clear the teeth from weeds or other trash and obstructions. The two parts of my harrow are connected by means of a very simple and strong hinge, consisting of two pieces of strap-iron, E, connected by two bolts, F, in one end thereof, and one bolt, F', in the other end, the latter bolt forming the pivot for the hinge. The handles C have braces D, made of strap-iron, and fastened by wood-screws or bolts.

A secondary set of handles and draw-bar may be used (the same being shown in dotted lines) to adapt the harrow for being drawn backward as a leveling and smoothing harrow for wheat-fields. The draw-bar G is provided with two chains, H, for connecting the same to the front bar of the harrow, as shown in Fig. 1. This attachment allows either half of the harrow to be tilted up in passing stumps or stones, or to clear the harrow of weeds or other trash or obstructions, as indicated in dotted lines in Fig. 2, without interfering with the whiffletree or draft of the team.

My improved harrow-tooth is made in the shape of a butcher-knife blade, about ten inches long, one and one-fourth wide, and one-fourth thick, and weighing fourteen ounces. I propose to vary the number of teeth, but prefer as a rule to use thirty-five in number. These teeth are to be set obliquely to the line of travel in the bars, so as to give them a slight mold-board action, and push the narrow furrows slightly to one side and thus completely loosening and pulverizing the ground. The whole series of teeth are properly distributed in the five bars A so as to cut furrows of about one inch and a half in width, and yet the teeth, being on different bars, travel several inches apart and thus enable the teeth to pass stones and clods of considerable size without clogging. Some of the teeth turn the furrow to the right and others to the left, as shown in the drawings. The first bar A has the teeth set to push the furrow to the right, the second to the left, and so on, through the series. The teeth should fit closely into the mortises of the frame, being driven in from above, and the shank of each tooth has a small lug, $t$, thereon, as seen in Fig. 4, for the purpose of preventing the tooth from going down too low in the frame, and a common cut-nail may be used, if necessary, as a key driven in front of the tooth to fasten the same in place, or a hole through the tooth with a small nail driven therein may serve the same purpose.

The teeth of my harrow may be made from a bar of spring-steel, one and one-fourth inch wide and one-fourth of an inch thick, sixteen inches in length of this bar being sufficiently long to cut two teeth of ten inches in length, the bar being cut on a slant, thus allowing the points to overlap two inches as the blanks are cut. In this way the work of forging is very little, and the waste of steel is but a trifle; but it may be better to use a die to cut out the teeth; or they may be molded from cast-steel. The teeth are set with the straight edge inclined downward and forward, as seen in Fig. 6, so that the point will dip into the ground like a cultivator-tooth; but when the harrow is drawn backward for leveling wheat-fields the reverse inclination of the teeth and the curved edges near the point enable them to more easily ride over clods and crush the same.

I am aware that reversible harrows and reversible harrow-teeth with one or both edges sharpened are not new.

I claim—

1. The described reversible harrow-tooth, being flat and thin like a knife-blade, and having a straight sharp edge on one side and a curved edge at the point on the opposite side, substantially as set forth.

2. In combination with a reversible harrow-frame, the described teeth, each having a straight sharp edge on one side and a short curved edge at the point on the opposite side, and set inclined downward and forward, as shown, so as to dip into the ground, substantially as set forth.

3. In a hinged sectional harrow, the harrow-teeth herein described, in combination with the two series of transverse bars A, having oblique mortises therein, one series of teeth being set in said mortises so as to turn the furrows to the right, and another series set to turn the furrows to the left, substantially as described.

4. The described reversible harrow-tooth, thin and flat like a knife-blade, and having a straight sharp edge on one side, and a curved edge at the point on the other side, and a projection or lug, t, substantially as set forth.

In testimony whereof I affix my signature in presence of two witnesses.

JOSEPH DARBY.

Witnesses:
DANIEL BREED,
C. P. CRANDALL.